Oct. 25, 1932.　　　　F. R. KRAUSE　　　　1,883,966

OVERRUNNING CLUTCH

Filed Sept. 20, 1930　　　2 Sheets-Sheet 1

WITNESSES
a B Wallace.
W. D. O'Connor

INVENTOR
Frank R. Krause
by Brown & Critchlow
his attorneys

Oct. 25, 1932.   F. R. KRAUSE   1,883,966

OVERRUNNING CLUTCH

Filed Sept. 20, 1930   2 Sheets-Sheet 2

WITNESSES
A. B. Wallace.
W. D. O'Connor

INVENTOR
Frank R. Krause
by
Brown & Critchlow
his attorneys

Patented Oct. 25, 1932

1,883,966

UNITED STATES PATENT OFFICE

FRANK R. KRAUSE, OF YOUNGSTOWN, OHIO

OVERRUNNING CLUTCH

Application filed September 20, 1930. Serial No. 483,237.

My invention relates, generally, to clutches and particularly to clutches of the over-running type.

Clutches of the over-running or ratchet type are useful in mechanisms in which it is desirable that one rotating part, usually a driven member, be permitted to run faster under certain operating conditions than another part, usually the driving member. A clutch of this general classification ordinarily comprises a ratchet wheel, usually mounted on the member to be driven, and one or more spring pressed ratchet pawls carried by the driving member for engaging the ratchet wheel.

The over-running clutches of the prior art have several well-known disadvantages which have made their use objectionable in some instances and have thus limited their field of application. Among the more common objections may be mentioned that directed to the noise caused by the pawls dropping into the notches of the ratchet wheel when the clutch is operating in the over-running direction. There is also danger that excessive stresses may be set up in the clutch elements or breakage occur in the event that the ratchet pawls do not properly engage the ratchet wheel when torque is applied in the driving direction. It may happen that a reversal of the relative motion between the two parts of the clutch, when over running, may occur just as the pawls arrive at the points of the ratchet teeth. In such case the pawls may be prevented from dropping into the ratchet notches and will engage only the tips of the teeth, or if there is some looseness or inaccuracy in the mechanism, only one of several pawls may engage the ratchet wheel. In either event, if a large torque is transmitted, breakage may occur in the pawls or in the ratchet teeth which are thus overloaded.

An object of my invention is to provide a clutch of the over-running type which will operate silently when part of the clutch is turning relative to, or over-running the other part.

Another object of my invention is to provide means for guiding the pawls of a ratchet clutch into the ratchet notches in such manner that full engagement of the pawls with the notches will be ensured.

It is a further object of my invention to provide a strong and rugged over-running clutch which is particularly adapted for use on heavy machinery and which is so designed that undue wear will not occur between the parts when the clutch is operating in the over-running direction.

Figure 1:
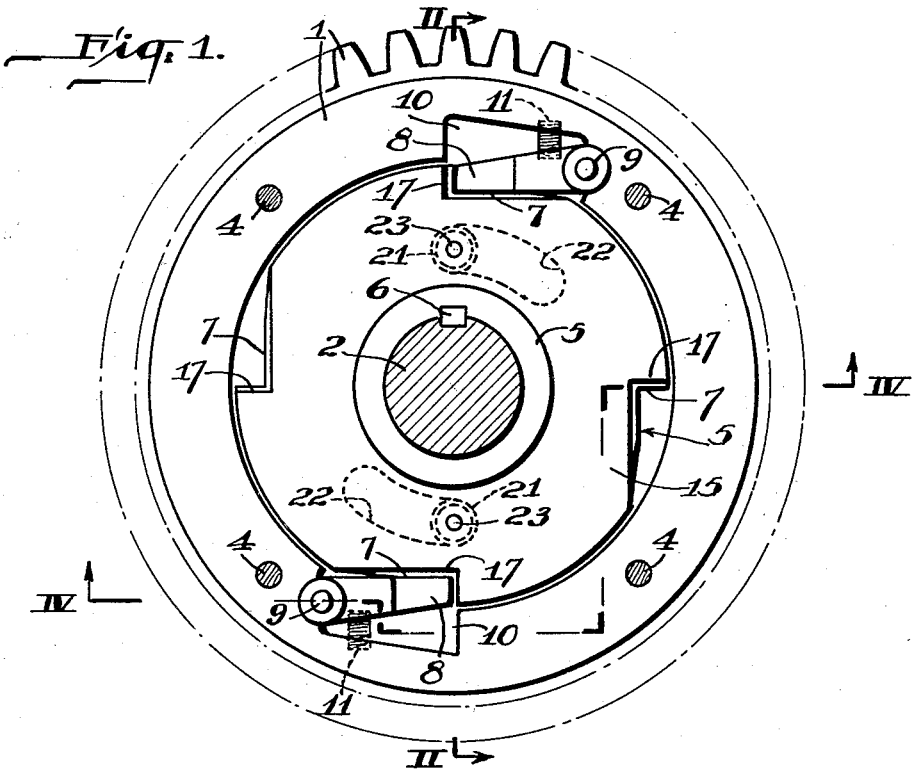
Figure 2:
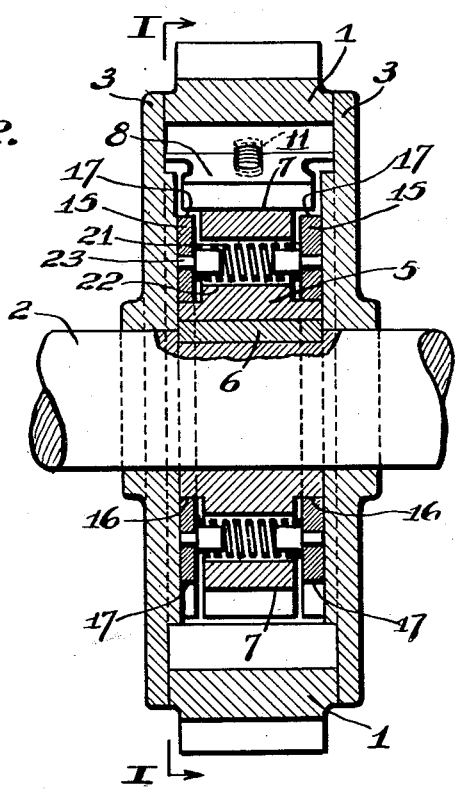
Figure 3:
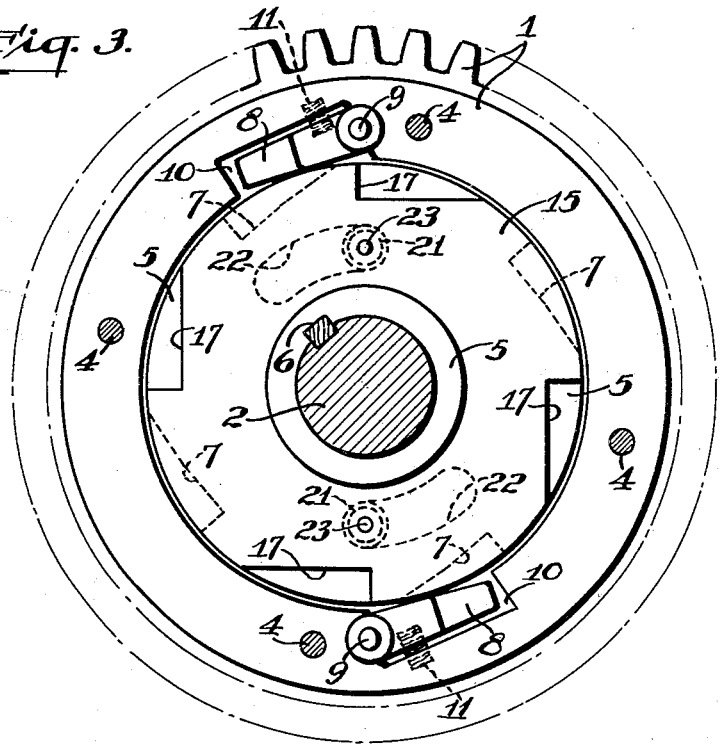
Figure 4:
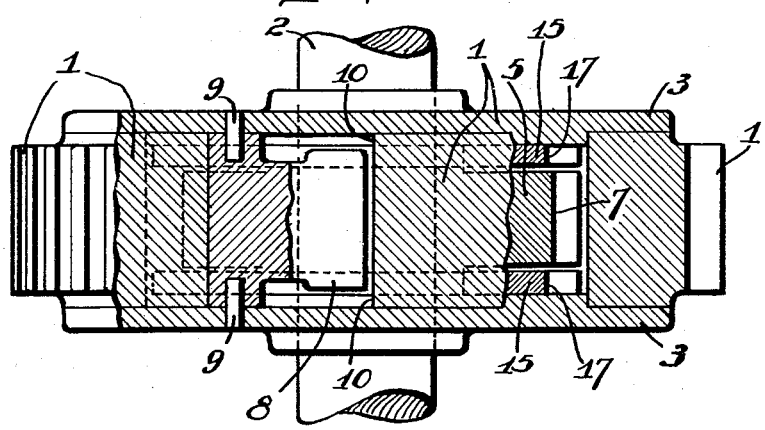

These and other objects of my invention will appear, and a detailed understanding of it will be had, as the following parts of this specification are read in conjunction with the accompanying drawings, which show apparatus that is herein described as suitable for achieving the objects and in which Fig. 1 is a view, partly in end elevation and partly in cross section, taken on the plane represented by the line I—I in Fig. 2 of a clutch mechanism embodying my invention shown with one side plate removed and with the clutch detents in engagement with the ratchet notches; Fig. 2 is a view in longitudinal section taken on the plane represented by the line II—II in Fig. 1; Fig. 3 is a view similar to Fig. 1 showing the detents out of engagement with the ratchet notches, which notches are shown closed in accordance with my invention; Fig. 4 is a view in longitudinal section taken on the planes indicated by the line IV—IV in Fig. 1.

According to this invention, a ratchet wheel is utilized in conjunction with a rotatably mounted member which carries ratchet detents to constitute an over-running clutch of well known construction. To prevent noise and to guide the detents into the ratchet notches, suitable side plates are provided on the ratchet wheel that have notches corresponding to the notches in the wheel and disposed in alignment with them to permit the detents to drive the ratchet wheel. When the clutch is operated in the over-running direction the side plates are permitted to move, with the member carrying the detents, through an angle to a position in which the notches in the plates are no longer in line with the notches in the ratchet wheel. When in this position the plates guide the ratchet detents over the ratchet notches, thus preventing noise and undue wear on the clutch parts.

Although the clutch may be constructed in various other ways, as for instance, with the ratchet teeth in an external member and with the detents protruding from an internal hub, and it is obvious that either member may be utilized to drive the other member; inasmuch as the structure shown in the drawings constitutes a practical embodiment of the invention, it will be particularly referred to in the following portion of this specification.

The particular embodiment of my invention which has been illustrated in the drawings is a relatively large and rugged over-running clutch for use on heavy metal working machinery such as punch presses, piercing mills for tube forming machinery or other similar equipment for working hot or cold metal. The driving member, which may be any well known machine element, is here represented by a gear wheel that comprises a gear rim 1, having gear teeth on its outer periphery, which is carried on a shaft 2 by means of side plates or hub plates 3 journalled on the shaft and suitably attached to rim 1 by means of rivets 4 or other well known attaching means. The rim 1 and side plates 3 constitute a housing which encloses a ratchet wheel or head 5 of cylindrical shape. As shown, the ratchet wheel 5 is carried by the shaft 2 and is secured thereon by means of a key 6 to constitute the driven member of the clutch. In the particular ratchet wheel shown, four equally spaced ratchet notches 7 are provided in its periphery and are separated from each other by portions of the periphery somewhat longer than the notches and having the normally arcuate contour of the wheel. For transmitting torque from the driving member to the ratchet wheel 5 a plurality of detents 8, (in this instance two which are diametrically disposed) are pivoted to the hub plates 3 by means of pivot pins 9 that are disposed parallel to the axis of rotation of the clutch and support the detents within chambers 10 in the rim 1. To force the detents 8 into the ratchet notches 7 and to overcome the effect of centrifugal force when the clutch is rotating, resilient means, as small helical springs 11, are provided between the inner surface of each chamber 10 in the rim 1 and the outer surface of each detent 8.

Referring particularly to Fig. 1, in accordance with the known operation of overrunning clutches, the detents 8 will be held in engagement with the ratchet notches 7 during the time the torque is applied to the gear rim 1 in the direction tending to turn it counterclockwise. In this position the detents 8 will cause the ratchet wheel 5 and shaft 2 to rotate as a unit with the gear rim 1. However, in the event that the gear rim 1 is turned clockwise relative to the ratchet wheel 5, the detents 8 will be drawn out of the ratchet notches 7 and will be held in contact with the cylindrical intervening peripheral portions of the wheel 5.

In over-running clutches of ordinary construction as the driving member continued to turn the detent 8 would be snapped into the next succeeding notch 7 by the spring 11 and each detent would continue to engage and disengage all of the notches in the ratchet wheel in succession as long as the driven member continued to over run the driving member. However, in accordance with my invention I have provided means for carrying the detents 8 over the notches 7 during the time that the driven portion of the clutch is over running the driving member. For this purpose arcuate members are provided which guard the notches 7 when the driving member turns clockwise relative to the driven member and close them against entry of the detents. These guarding devices are so designed that when the driving member turns counterclockwise relative to the driven member they will be moved from the notches 7 and permit the detents 8 to engage them for driving the ratchet wheel 5.

As shown in the drawings, the guarding means comprises a pair of annular plates 15 of outer diameter equal to the diameter of the ratchet wheel, one of which is disposed at each side of ratchet wheel 5 and journalled on cylindrical extensions 16 on the hub of the ratchet wheel. As best illustrated in Fig. 1, each of the plates 15 is provided with four notches 17 which correspond to the notches 7 in the ratchet wheel 5 and are made somewhat larger to provide ample clearance space. When the plates 15 are in the position shown in Fig. 1 the notches 17 are disposed in alinement with the notches 7 in such manner that the detents 8 may freely engage them.

To provide for silent operation of the clutch when over running, it is simply necessary to turn the plates 15 relative to the wheel 5 to the position shown in Fig. 3 in which the notches 17 in the plates 15 are out of alinement with the notches 7 in the wheel 5 in such manner that cylindrical portions of the plates 15 are disposed adjacent the notches 7. When in such position the ends of the detents 8, which extend past the sides of the ratchet wheel 5, as shown in Fig. 2, bear upon the cylindrical surfaces of the plates 15 and ride over the notches 7. Thus, a continuous cylindrical path or bearing surface is provided for, and the notches are closed against entry of the detents 8.

That the operation of the notch guarding means may be fully automatic, provision is made for causing the plates 15 to turn or drift with the driving member through a predetermined angle in such manner that if the driving member turns clockwise relative to the driven member the plates 15 will drift to a position in which the notches 7 in the ratchet wheel will be guarded. If the driving member turns counterclockwise relative to the driven member the plates 15 will be so turned that the notches 17 therein will coincide with the notches 7 in the ratchet wheel and permit the detents 8 to engage them for driving the driven member. This is accomplished by establishing frictional connection between the guard plates 15 and the hub plates 3 of the driving member.

As best shown in Fig. 2 a plurality of helical springs 21 are disposed within arc-shaped openings 22 in the ratchet wheel 5 with their ends in engagement with the plates 15 in such manner that the plates are forced outwardly against the inner surfaces of the hub plates 3. The springs 21 are of such strength as to exert only sufficient force to provide for light frictional engagement between the hub plates 3 and the guard plates 15, which is just sufficient to move the plates 15 relative to the ratchet wheel 5 under the circumstances of relative motion between the driving and the driven members, which were explained hereinbefore. To prevent the plates 15 from turning continuously with the driving member, bosses or pins 23 are provided and disposed to extend from each plate into the arcuate slots 22 in the ratchet wheel 5. The pins 23 are made of such diameter that they may be inserted within the ends of the springs 21 and thus also function to hold the springs in their proper operating positions.

As may be seen in Fig. 1, the arcuate slots 22 are so cut that when the notches 17 in the plates 15 are in alinement with the notches 7 in the wheel 5 the bosses 23 will engage one end of the slots 22. In the event that the plates 15 are moved clockwise relative to the wheel 5 by frictional engagement with the driving member, the bosses 23 and springs 21 will move within the arcuate slots 22 a sufficient distance to permit the notches 17 to move out of alinement with the notches 7, at which point the bosses 23 will engage the other ends of the arcuate slots 22.

In addition to holding the detents 8 out of the notches 7 when the clutch is over running the plates 15 also function to guide the detents 8 into the notches 7 during the period in which the driving member may be rotating counter-clockwise relative to the driven member. This functioning of the plates 15 may best be understood by referring to Fig. 3. If the driving member is turned counter-clockwise relative to the driven member from the position shown it is clear that the plates 15 will move with the driving member through their arc of operation and will prevent the detent 8 from entering the notch 7 which is directly beneath it. Before the detent 8 arrives over the second notch 7 the plates 15 will have moved to their final positions and the notches 17 will be in alinement with the notches 7 in such manner that the detent 8 may enter the extreme end of the notch 7 and move along the bottom of the notch into full engagement with its working surfaces. Upon studying the drawings it will be readily seen that this procedure takes place regardless of the position of the detent 8 relative to the notches 7 at the time of reversal of rotation between the driving and the driven members.

By reason of this guiding action of the plates 15 it is impossible for the detents 8 to engage only the tips of the notches 7 or for only one detent to engage a notch while the other detent remains out of engagement by reason of the fact that it had not passed the edge of the notch at the moment reversal of motion took place.

From the foregoing description of my clutch mechanism and explanation of its mode of operation, it is apparent that I have provided an over-running clutch that will operate silently when over running, as well as when transmitting torque. Further, it is clear that the means for preventing noise in my clutch also serves to prevent damage to the clutch parts by properly guiding the detents into engagement with the ratchet wheel and by obviating wear on the detents and ratchet notches which occurs in ordinary over-running clutches by reason of the detents moving into and out of each successive notch when the clutch is over running.

Although I have shown and described a particularly practical embodiment of my invention, it will be apparent to others skilled in the art to which this device relates that modifications may be made in the design of and method of mounting the means which I have shown for guarding the ratchet notches without departing from the spirit and scope of my invention, as defined in the appended claim.

I claim:

An over-running clutch mechanism comprising a shaft, a ratchet wheel having spaced ratchet notches secured on the shaft, hub plates journalled on the shaft at each side of the ratchet wheel, a rim member disposed between the outer edges of the hub plates and joined to them to constitute a housing, detents pivotally mounted within the housing for engaging the notches in the ratchet wheel, a pair of annular plates disposed at the sides of the ratchet wheel and having notches corresponding to the notches in the wheel, resilient means for holding the plates in frictional engagement with the hub plates, and means for limiting the movement of the plates relative to the ratchet wheel whereby the notches in the plates will match the notches in the ratchet wheel when the housing is turned relative thereto in the driving direction and the notches in the wheel will be guarded by cylindrical portions of the plates when the housing is turned in the over-running direction.

In testimony whereof, I sign my name.

FRANK R. KRAUSE.